C. F. A. Seitz,
Egg Beater.

No. 88,672. Patented Apr. 6, 1869.

Witnesses
John Lille
A. Acton

Inventor
C. F. Augustus Seitz
per Francis D. Pastorius
Attorney

C. F. AUGUSTUS SEITZ, OF PHILADELPHIA, PENNSYLVANIA, ASSIGNOR TO HIMSELF AND LOUIS WAGNER, OF SAME PLACE.

Letters Patent No. 88,672, dated April 6, 1869.

IMPROVED EGG-BEATER.

The Schedule referred to in these Letters Patent and making part of the same.

*To all whom it may concern:*

Be it known that I, C. F. AUGUSTUS SEITZ, of the city and county of Philadelphia, and State of Pennsylvania, have invented a new and useful Egg-Beating Machine; and I do hereby declare that the following is a full, clear, and exact description of the same, reference being had to the accompanying sheet of drawings, and to the letters of reference marked thereon, making part of this specification, in which—

Figure 1:
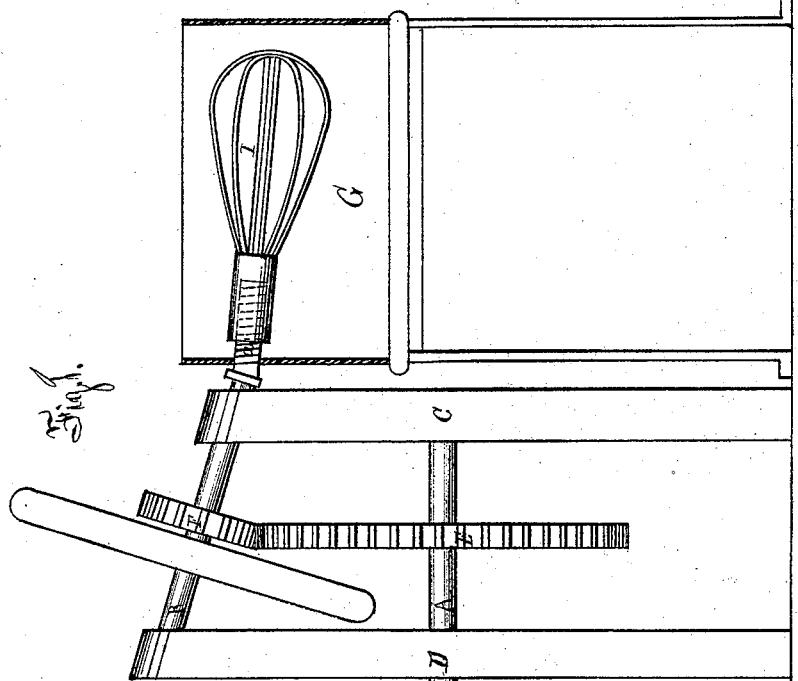

Figure 1 is a side view, and

Figure 2:
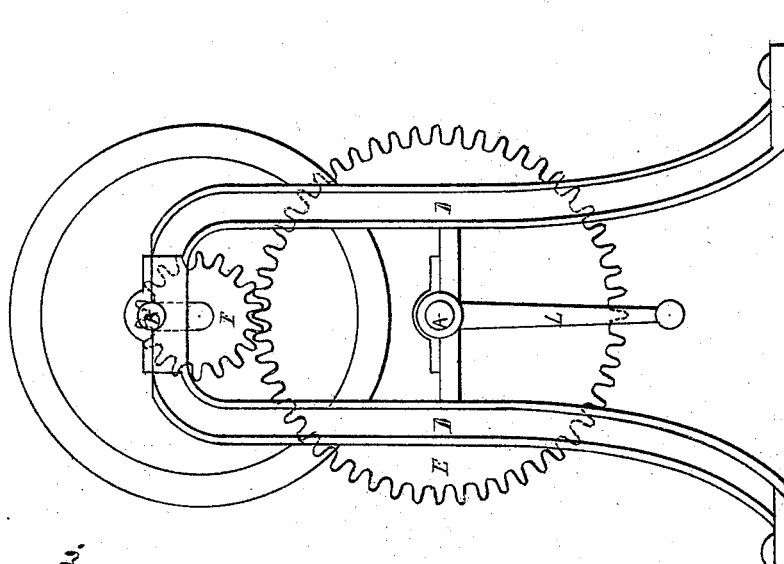

Figure 2, an end view.

Similar letters refer to similar parts in the several views.

A B are shafts, which turn in suitable boxes fitted to the vertical housings C D.

The lower shaft, A, is horizontal, and carries the spur-gear wheel E, while the upper one, B, inclines inwardly, and carries the pinion-wheel F, which gears with spur-wheel E.

G is a movable pan, which is carried by the stand H, adjacent to the housing C.

I is a beater, or whip, which screws on to the screw $a$, which forms a continuation of the inclined shaft B.

It will be seen that the end, $a$, is at an angle to the shaft B, and projects into the pan G.

A handle, or lever L, on the outer end of the lower shaft A, is the medium for communicating motion to the machine, and a fly-wheel, K, on the upper shaft B, equalizes its movements.

The eggs to be beaten are poured from their shells into the movable pan, and power applied to the lever, or handle J, which is transmitted to the shaft B by the gear-wheels E F. The screw-end, $a$, as before shown, is at an angle to its shaft B, is caused to describe a circle, or wabble, which is imparted to the whip, or beater I, causing it to sweep the pan, and thoroughly beat and mix the eggs.

The pan G, being movable, can be used apart from the remainder of the machine for mixing flour. The beater can also be unscrewed from the screw-end, $a$, and be applied with the pan.

What I claim as my invention, and desire to secure by Letters Patent, is—

The horizontal and inclined shafts A B, frames, or housings C D, gear-wheels E F, fly-wheel K, screw-end $a$, beater, or whip I, and the movable pan G, when constructed and arranged substantially as shown and described.

In testimony whereof, I hereunto sign my name to this specification in presence of two subscribing witnesses.

C. F. AUGUSTUS SEITZ.

Witnesses:
FRANCIS D. PASTORIUS,
A. ACTON.